United States Patent
Matsui (10) Patent No.: US 7,027,184 B2
(45) Date of Patent: Apr. 11, 2006

(54) IMAGE PROCESSING APPARATUS AND METHOD, AND IMAGE FORMING APPARATUS

(75) Inventor: Kenta Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 09/893,644

(22) Filed: Jun. 29, 2001

(65) Prior Publication Data

US 2002/0001097 A1    Jan. 3, 2002

(30) Foreign Application Priority Data

Jun. 29, 2000    (JP)    ............... 2000-196829

(51) Int. Cl.
*G06F 15/00*    (2006.01)
*G06K 1/00*    (2006.01)

(52) U.S. Cl. ............ 358/1.9; 358/1.9; 358/2.1; 345/581; 345/592; 345/632; 345/633

(58) Field of Classification Search ........... 358/1.9, 358/2.1; 345/633, 581, 592, 632
See application file for complete search history.

(56) References Cited

U.S. PATENT DOCUMENTS

| | | | | |
|---|---|---|---|---|
| 5,371,610 A | * | 12/1994 | Sugawa | ............ 358/434 |
| 5,577,179 A | * | 11/1996 | Blank | ............ 345/639 |
| 6,118,427 A | * | 9/2000 | Buxton et al. | ............ 345/629 |
| 6,359,631 B1 | * | 3/2002 | DeLeeuw | ............ 345/629 |
| 6,377,269 B1 | * | 4/2002 | Kay et al. | ............ 345/589 |
| 6,744,430 B1 | * | 6/2004 | Shimizu | ............ 345/420 |

OTHER PUBLICATIONS

Azriel Rosenfeld and Avinash C. Kak, "Digital Picture Processing," second edition, vol. 2, pp. 66-68.*

* cited by examiner

*Primary Examiner*—Edward Coles
*Assistant Examiner*—Yixing Qin
(74) *Attorney, Agent, or Firm*—Fitzpatrick, Cella, Harper & Scinto (57) ABSTRACT

The object of the present invention is to appropriately determine an attribute of a synthesized pixel at the time of synthesizing processing. An attribute of a pixel, synthesized based on a transmissivity α of a source pixel, is determined in the following manner. A threshold value T is obtained from attribute designation data (S603), the transmissivity α is compared with the threshold value T (S604), and if the transmissivity α is larger than the threshold value T, an attribute of a destination pixel is determined as the attribute of the synthesized pixel (S605), while if the transmissivity α is smaller than the threshold value T, an attribute of a source pixel is determined as the attribute of the synthesized pixel (S606).

18 Claims, 11 Drawing Sheets

| DESTINATION \ SOURCE | IMAGE | GRAPHIC | CHARACTER |
|---|---|---|---|
| IMAGE |  | DESTINATION / SOURCE (THRESHOLD VALUE 3) | DESTINATION / SOURCE (THRESHOLD VALUE 5) |
| GRAPHIC | DESTINATION / SOURCE (THRESHOLD VALUE 1) |  | DESTINATION / SOURCE (THRESHOLD VALUE 6) |
| CHARACTER | DESTINATION / SOURCE (THRESHOLD VALUE 2) | DESTINATION / SOURCE (THRESHOLD VALUE 4) |  |

IMAGE PROCESSING APPARATUS AND METHOD, AND IMAGE FORMING APPARATUS

FIELD OF THE INVENTION

The present invention relates to an image processing apparatus having a function for, e.g., synthesizing two images, and method thereof and an image forming apparatus.

BACKGROUND OF THE INVENTION

When an image forming apparatus having an image synthesizing function performs synthesizing processing for overlaying a source pixel on a destination pixel, a transmissivity is designated as one of the parameters. The transmissivity designates a transmission level of a source pixel overlaid on a destination pixel in image synthesizing processing. For instance, when the transmissivity is 100%, a pixel obtained after synthesizing processing is a destination pixel. When the transmissivity is 0%, a pixel obtained after synthesizing processing is a source pixel.

However, in the conventional synthesizing processing, attribute data of a source pixel, overlaid on a destination pixel, is always used as attribute data of a synthesized pixel without taking the transmissivity into consideration. Note that attribute data includes, for instance, the type of object to which the pixel belongs, or the like.

Even in a case where the source pixel and destination pixel have different attributes, the attribute data of the source pixel is always used as attribute data of a synthesized pixel.

In an extreme case, when the transmissivity is set to 100%, a pixel obtained as a result of synthesizing processing has an appearance of the destination pixel, but has an attribute of the source pixel.

SUMMARY OF THE INVENTION

The present invention has been proposed in view of the foregoing conventional example, and has as its object to provide an image processing apparatus and method for determining attribute data of a pixel, synthesized at a predetermined transmissivity, so as to reflect the transmissivity, and an image forming apparatus.

In order to attain the above object, the present invention has the following configuration.

More specifically, the present invention provides an image processing apparatus comprising: synthesizing means for synthesizing a first pixel with a second pixel so as to generate a new pixel based on a transmissivity indicative of a ratio of the first pixel to the second pixel in the new pixel; and attribute determination means for determining an attribute of the new pixel based on attribute data of the first pixel, attribute data of the second pixel, and the transmissivity.

According to an aspect of the present invention, in a case where the transmissivity is higher than a threshold value, the attribute determination means determines the attribute data of the second pixel as attribute data of the new pixel, whereas in a case where the transmissivity is lower than the threshold value, the attribute determination means determines the attribute data of the first pixel as the attribute data of the new pixel.

Furthermore, in a case where the transmissivity is higher than a first threshold value, the attribute determination means determines the attribute data of the second pixel as the attribute data of the new pixel, in a case where the transmissivity is lower than a second threshold value which is lower than the first threshold value, the attribute determination means determines the attribute data of the first pixel as the attribute data of the new pixel, and in a case where the transmissivity is lower than the first threshold value but higher than the second threshold value, the attribute determination means determines attribute data of a pixel having a higher priority as the attribute data of the new pixel.

Furthermore, the attribute determination means determines the threshold value in accordance with a combination of values of the attribute data of the first pixel and the second pixel.

Furthermore, the image processing apparatus further comprises image processing means for performing image processing on a pixel, obtained by the synthesizing means, based on the attribute data of the pixel.

Furthermore, the processing performed by the image processing means includes color conversion processing.

Furthermore, the processing performed by the image processing means includes pseudo-tone processing.

Furthermore, the image processing apparatus further comprises output means for outputting an image, constructed with a pixel, synthesized by the synthesizing means and having an attribute determined by the attribute determination means.

Furthermore, the output means is printing means.

Furthermore, the first pixel is a pixel of an image generated based on print data received from a host computer, and the second pixel is a pixel of a form image stored in advance in the image processing apparatus.

Furthermore, a value of the attribute data is any one of a character, a graphic, or an image.

According to another aspect of the present invention, the present invention provides an image processing apparatus comprising: an input interface unit to which print data is inputted; first memory for storing form image data; a processing unit for generating input image data based on the print data, synthesizing the input image data with the form image data based on a designated transmissivity, and determining attribute data of synthesized image data based on attribute data of the input image data, attribute data of the form image data, and the transmissivity; and second memory for storing image data generated by the processing unit and attribute data of the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

FIRST EMBODIMENT

Hereinafter, an example where the present invention is applied to a laser beam printer (to be referred to as an LBP) is described in detail with reference to accompanying drawings.

First, a construction of the LBP according to the first embodiment is described with reference to FIG. 1.

Figure 1:
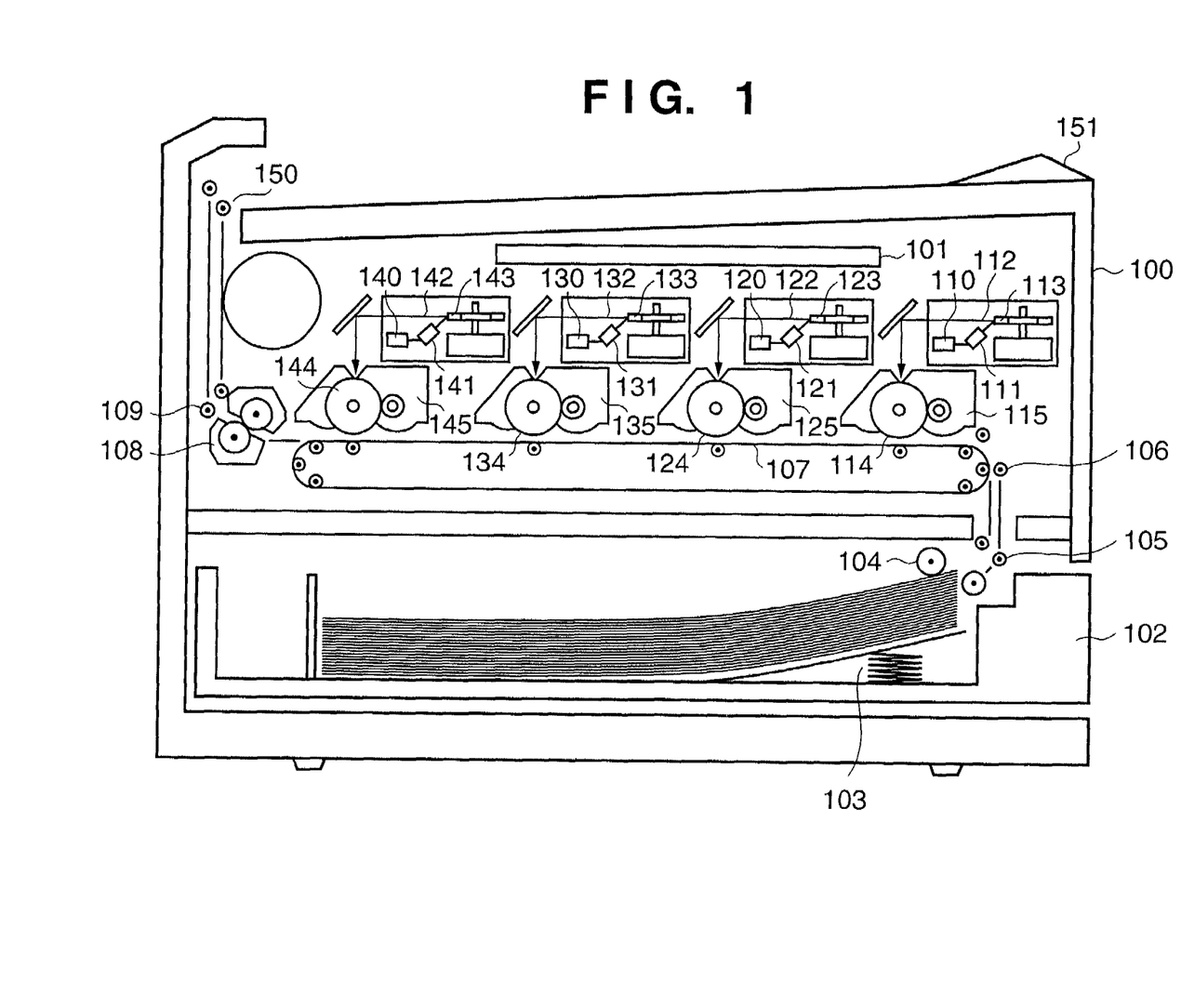
FIG. 1 is a cross-section showing a construction of a laser beam printer, to which an embodiment of the present invention is applied.

FIG. 1 is a cross-section showing an internal construction of the LBP according to the first embodiment.

Figure 2:
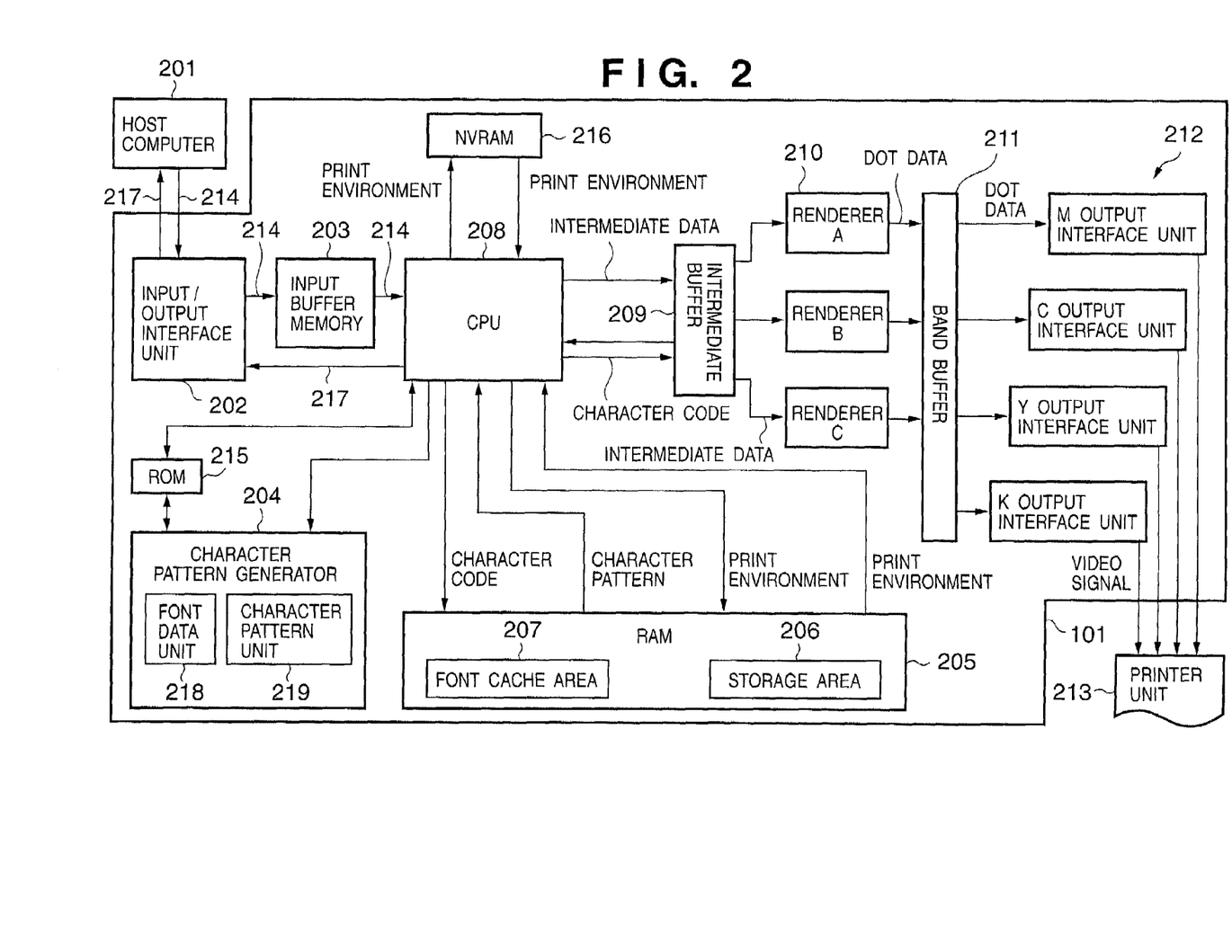
FIG. 2 is a block diagram showing a construction of a controller in the main body shown in FIG. 1.

Referring to FIG. 1, an LBP main body 100 generates character patterns, graphics, images or the like and forms an image on printing paper serving as a recording medium, according to a command for printing a character, a command for rendering various graphics, a command for rendering an image, or a command for designating a color and so forth, supplied from an externally connected host computer (host computer 201 shown in FIG. 2). An operation panel 151 includes LED and LCD display devices for providing operation switches or displaying a printer state. A printer control unit 101 controls the entire LBP 100 and interprets a character printing command and so on supplied from the host computer.

Note that the LBP according to the first embodiment converts red (R), green (G) and blue (B) data to magenta (M), cyan (C), yellow (Y), and black (K) data, and performs image formation and development of respective colors in parallel. Therefore, the LBP comprises image formation and development mechanisms for each of the M, C, Y and K data. The printer control unit 101 generates print image data for each of M, C, Y and K data, converts the image data to video signals, and outputs the video signals to M, C, Y and K laser drivers respectively.

A laser driver 110 for magenta (M) is provided for driving a semiconductor laser 111, and turns on or off a laser beam 112 which is emitted from the semiconductor laser 111 in response to an inputted video signal. The laser beam 112 is reciprocally moved by a rotational polygon mirror 113 for scanning an electrostatic drum 114. By this operation, an electrostatic latent image of a character or a graphic pattern is formed on the electrostatic drum 114. The latent image is developed by a development unit (toner cartridge) 115, located in the circumference of the electrostatic drum 114, and transferred to printing paper.

With respect to C, Y and K also, the image formation and development mechanisms similar to that of M are provided. The image formation and development mechanisms for C comprises a laser driver 120, a semiconductor laser 121, a rotational polygon mirror 123, an electrostatic drum 124, and a development unit 125. The image formation and development mechanisms for Y comprises a laser driver 130, a semiconductor laser 131, a rotational polygon mirror 133, an electrostatic drum 134, and a development unit 135. The image formation and development mechanisms for K comprises a laser driver 140, a semiconductor laser 141, a rotational polygon mirror 143, an electrostatic drum 144, and a development unit 145. Since each of the functions is the same as that of the image formation and development mechanisms for M, detailed description is not provided herein.

For printing paper, a cut sheet is used. Cut-sheet printing paper is stacked in a paper cassette 102 inserted in the LBP, and is kept at a predetermined height by a spring 103. A cut sheet is conveyed to the internal portion of the LBP main body by a paper supply roller 104 and paper conveyance rollers 105 and 106, and carried to each of the image formation and development mechanisms for M, C, Y and K by a paper conveyance belt 107. At this step, toner images of respective colors are formed on printing paper.

Each of the M, C, Y and K toner (powder ink), transferred on the printing paper, is fixed on the printing paper with heat and pressure by a fixer 108. The printing paper is outputted to the top portion of the LBP main body by conveyance rollers 109 and 150.

FIG. 2 is a block diagram showing a brief construction of the printer control unit 101 of the LBP shown in FIG. 1.

Data 214 including commands for rendering a character, a graphic or an image, and color data is inputted from the host computer 201, serving as a print data generation source, to the printer control unit 101 of the LBP. In accordance with the commands or data, document data and so on is printed in page unit. An input/output interface unit 202 exchanges various data with the host computer 201. An input buffer memory 203 temporarily stores various data inputted through the input/output interface unit 202. A character pattern generator 204 comprises: a font data unit 218 storing character attributes, such as a width or height of a character, and addresses of actual character patterns; a character pattern unit 219 storing character patterns; and a read control program. The read control program, stored in ROM 215, includes a code convert function for computing an address of a character pattern which corresponds to an inputted character code.

RAM 205 includes a font cache area 207 storing a character pattern outputted by the character pattern generator 204, and a storage area 206 storing external character fonts or form data, present printing environment and so forth, outputted by the host computer 201. Since pattern data developed once as a character pattern is stored in the font cache area 207, the same character does not need to be developed plural numbers of times each time the character is printed. Therefore, development of character patterns is performed quickly.

A CPU 208 controls the entire printer control unit by executing a control program stored in the ROM 215. An intermediate buffer 209 stores internally used data (intermediate data), generated based on inputted data 214. When printing is performed, data for one page is received, the received data is converted to a simpler form of data, i.e., intermediate data, then stored in the intermediate buffer 209, rendered in band unit by a renderer 210, and outputted to a band buffer 211 as a print image. When image synthesizing processing which will be described later is performed, the synthesized image is temporarily stored in the intermediate buffer 209 as intermediate data.

Note that the renderer 210 includes renderers A, B and C having the same function, each of which can operate independently. In other words, the LBP according to the first embodiment can perform rendering in the maximum of three bands in parallel.

Furthermore, the band buffer 211 can store at least eight bands of print images. The print image outputted by the band buffer 211 is converted to a video signal by an output interface unit 212, and outputted to a printer unit 213. The printer unit 213 prints image data based on the video signal outputted by the output interface unit 212.

As mentioned above with reference to FIG. 1, the LBP according to the first embodiment performs image formation and development of M, C, Y and K data in parallel. Therefore, the output interface unit 212 comprises M output interface unit, C output interface unit, Y output interface unit, and K output interface unit for independently reading dot data out of the band buffer 211, converting the data to video signals, and outputting the video signals to the laser drivers 110, 120, 130 and 140 provided respectively for each of the color planes.

A non-volatile memory (NVRAM) 216 is constructed with a programmable non-volatile memory, such as generally used EEPROM or the like. In the NVRAM 216, set values or the like designated in the operation panel 151 are stored.

Data 217 is transmitted from the LBP to the host computer 201.

Note that the ROM 215 stores a program for interpreting data inputted from the host computer 201, a program for generating intermediate data, a control program for controlling the printer unit 213, a color conversion table for converting data in R, G and B color space to data in M, C, Y and K color space and so on.

Figure 3:
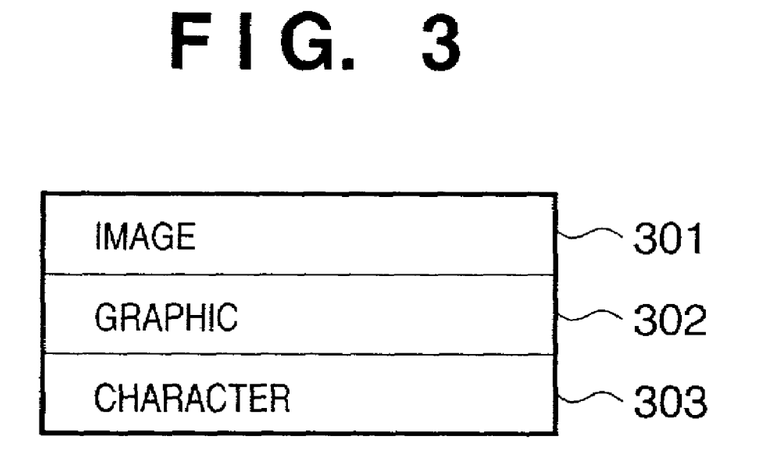
FIG. 3 shows attribute data of a pixel described in embodiments of the present invention.

When an image is to be printed in R, G and B color space by a printing apparatus, each pixel has attribute data. For instance, a pixel processed according to a character printing command has attribute data "character", a pixel processed according to a graphic rendering command has attribute data "graphic", and so forth. In other words, attribute data is specified by a rendering command transmitted by the host computer 201. Note that the attribute data of a pixel processed in the first embodiment includes three attributes: an image 301, a graphic 302, and a character 303 as shown in FIG. 3.

The attribute data can be used in the color conversion processing of converting R, G and B color space to M, C, Y and K color space. For instance, in a case where plural pixels have the same color component, it is possible to perform different dither processing depending on attribute data of the plural pixels. Moreover, in a case where a pixel regarded as black in the R, G and B color space is converted to M, C, Y and K color space, if the pixel has a "character" attribute, the pixel is converted to K, not to Y, M or C, so that the black character can more clearly be expressed.

Figure 4:
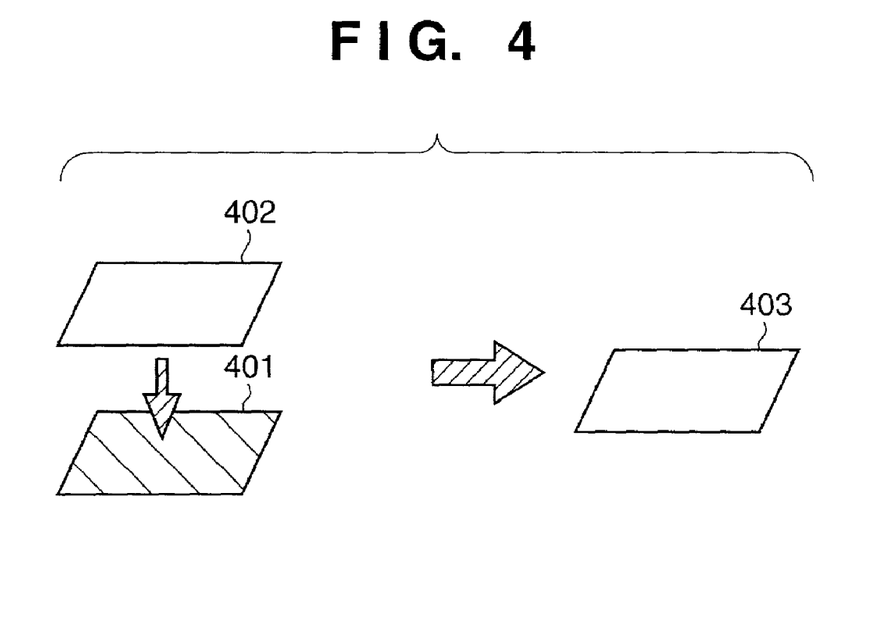
FIG. 4 illustrates the way a source pixel is overlaid on a destination pixel.

FIG. 4 is an explanatory view of synthesizing a source pixel 402, having "graphic" attribute data, with a destination pixel 401, having "character" attribute data, thereby generating a new pixel 403. In this case, whether the "character" or "graphic" is set as attribute data of the new pixel 403 is decided based on the transmissivity α. The transmissivity α is expressed by a value between 0 and 100%. When α=100%, the pixel on the bottom (destination pixel) can be seen, whereas when α=0%, the destination pixel cannot be seen at all. The transmissivity α is designated as a parameter at the time of image synthesizing processing, and stored in the RAM 205 or NVRAM 216 or the like. A color of synthesized pixel P is determined by, for instance, the following equation (1). Assume herein that R, G and B color components of pixel P are (Pr, Pg, Pb), and the color components of the source pixel and destination pixel are respectively (Sr, Sg, Sb) and (Dr, Dg, Db).

$$Px=((100-\alpha)/100)\cdot Sx+(\alpha/100)\cdot Dx \quad (1)$$

where x=r, g, b

More specifically, in this definition, each color component of the synthesized pixel P is given by a weighted average of the source pixel and destination pixel, with the transmissivity α as a weight. In other words, the transmissivity α represents the rate at which the color of the destination pixel accounts for the color of the synthesized pixel P.

Figure 5:
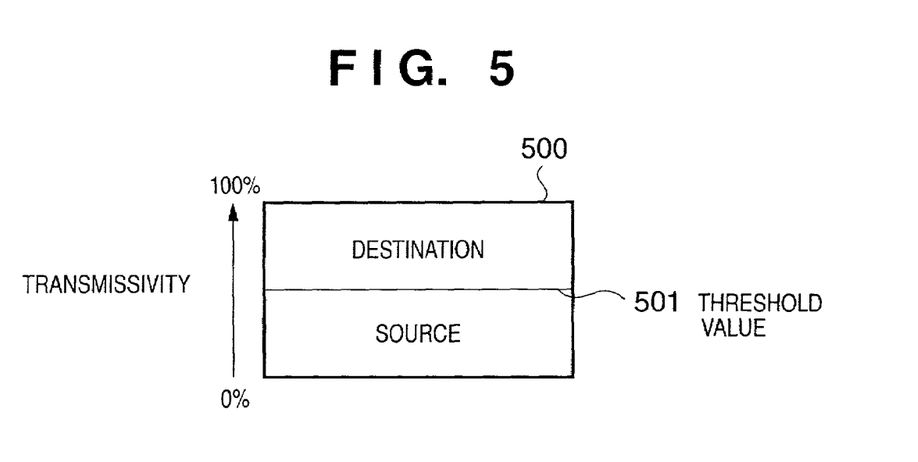
FIG. 5 shows attribute designation data where a threshold value is set between transmissivity 0% and 100%.

To determine attribute data of the pixel P based on the transmissivity α, attribute designation data 500 shown in FIG. 5 is prepared. The attribute designation data 500 includes a threshold value 501 set anywhere between the transmissivity 0% and 100%. The printing apparatus according to the first embodiment refers to the attribute designation data at the time of overlaying a source pixel on a destination pixel, and adopts the destination pixel's attribute data as the new pixel's attribute data if the transmissivity α is larger than the threshold value 501, but adopts the source pixel's attribute data if the transmissivity α is smaller than the threshold value 501. Note that the threshold value 501 is also stored in the RAM 205 or NVRAM 216 or the like. The threshold value 501 may be inputted from the host computer along with print data, or inputted by an operator through the operation panel.

Figure 6:
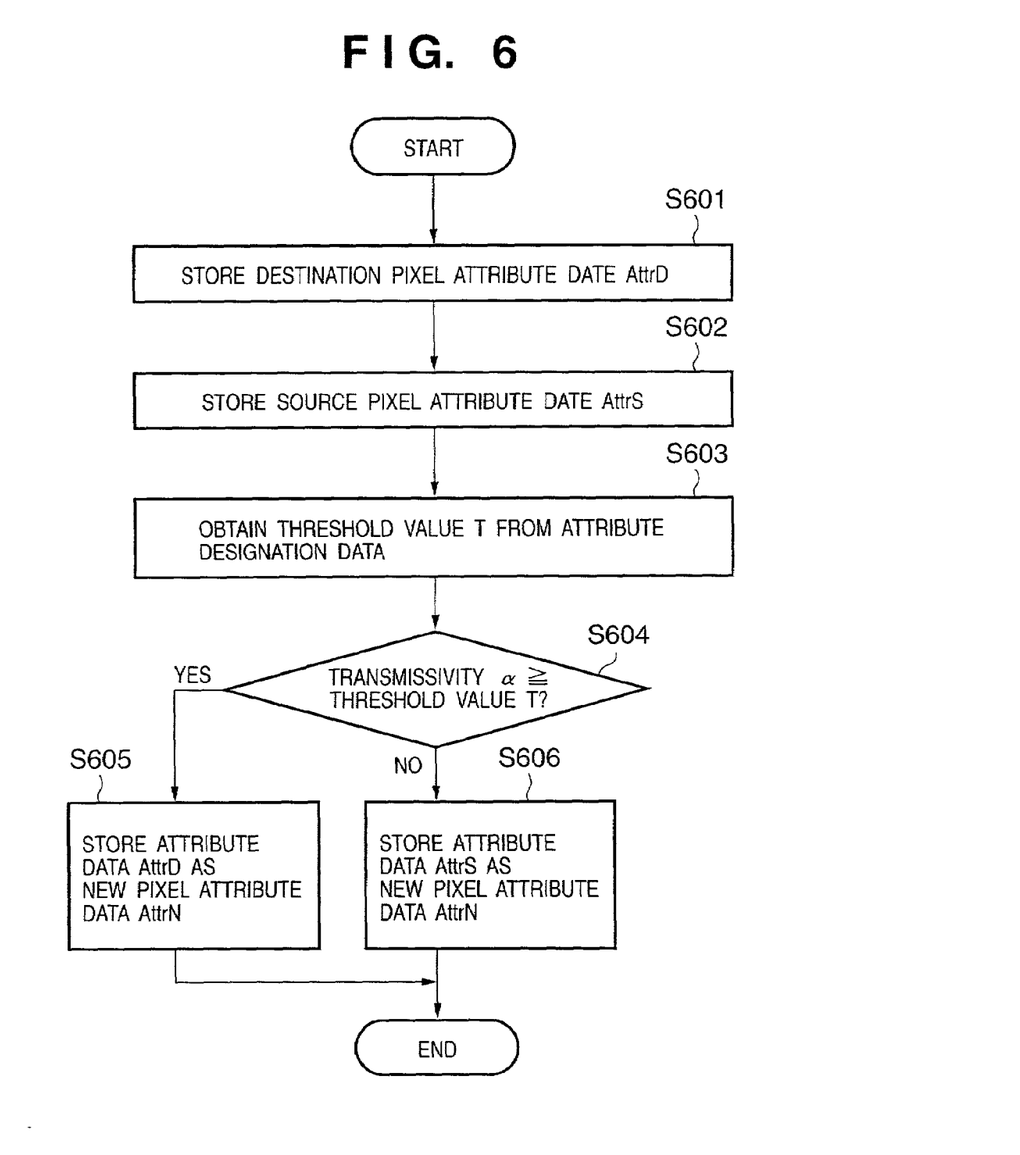
FIG. 6 is a flowchart showing processing steps of setting new attribute data according to a first embodiment.

With reference to the flowchart in FIG. 6, a description is provided on the steps of determining attribute data based on the transmissivity α set for a new pixel at the time of overlaying a source pixel on a destination pixel. The flowchart is executed by the CPU 208 when, for instance, image data generated based on print data inputted from the host computer 201 is synthesized with form image data stored in advance in the RAM 205. The synthesized image data is stored in the intermediate buffer. First in step S601, the destination pixel attribute data AttrD is obtained and stored.

In step S602, the source pixel attribute data AttrS is obtained and stored.

In step S603, a threshold value T is obtained by referring to the attribute designation data shown in FIG. 5.

In step S604, it is determined whether or not transmissivity α≧threshold value T stands. When transmissivity α≧threshold value T stands, the control proceeds to step S605 where the destination pixel attribute data AttrD is set as the new pixel attribute data AttrN. On the other hand, when transmissivity α<threshold value T stands in step S604, the control proceeds to step S606 where the source pixel attribute data AttrS is set as the new pixel attribute data AttrN.

The attribute value of a synthesized pixel is determined in the above-described manner. As expressed in equation (1), the transmissivity α represents the rate at which the color of the destination pixel accounts for the color of the synthesized pixel. Therefore, the attribute of a new pixel, obtained by synthesizing the source pixel with the destination pixel, is determined such that the destination pixel attribute is adopted when the color of the destination pixel accounts for the color of the synthesized pixel at a higher level than the threshold value T, while the source pixel attribute is adopted when the color of the destination pixel accounts for the color of the synthesized pixel at a lower level than the threshold value T.

The operation according to the first embodiment is performed in the foregoing manner.

According to the first embodiment, when the source pixel is overlaid on the destination pixel, attribute data of the new pixel is determined according to predetermined criteria. Parameters serving as the criteria include: destination pixel attribute data, source pixel attribute data, transmissivity, and attribute designation data (threshold value T). Defining herein that the destination pixel attribute data is AttrD, the source pixel attribute data is AttrS, the transmissivity is $\alpha$, and the threshold value is T, the attribute data AttrN of a synthesized pixel is expressed by the following equation.

$$AttrN=f(AttrD, AttrS, \alpha, T)$$

Since the threshold value T is a constant, the threshold value T can be removed from the parameters. Thus, the equation may be expressed as follows.

$$AttrN=f(AttrD, AttrS, \alpha)$$

In the conventional example, if the destination pixel 401 having "character" attribute data is synthesized with the source pixel 402 having "graphic" attribute data as shown in FIG. 4, the attribute data of the source pixel 402, i.e., "graphic", is adopted as the attribute data of the new pixel 403. However, according to the first embodiment, the attribute data of the new pixel 403 can be either "graphic" or "character" depending on the transmissivity $\alpha$ and threshold value T. Therefore, an attribute suitable to the transmissivity can be set.

By virtue of determining appropriate attribute data, processing designated in accordance with the attribute can be performed at the time of performing color conversion on the synthesized image or performing pseudo-tone processing for printing out an image.

Assume herein that a pixel of an image generated based on print data transmitted from the host computer is the source pixel and a pixel of a form image stored in advance in the printing apparatus is the destination pixel, and the steps shown in FIG. 6 are executed. A high-quality image can be generated by form overlay processing. The second and third embodiments to be described later also have the same effects.

SECNOD EMBODIMENT

In the first embodiment, the attribute data of the new pixel, obtained as a result of overlaying the source pixel on the destination pixel, is determined based on the transmissivity $\alpha$ and threshold value T. In the second embodiment, a priority order is provided to the attribute data of the destination pixel and source pixel. When attribute data of a new pixel is determined, the priority order is referred in addition to the transmissivity $\alpha$.

Figure 7:
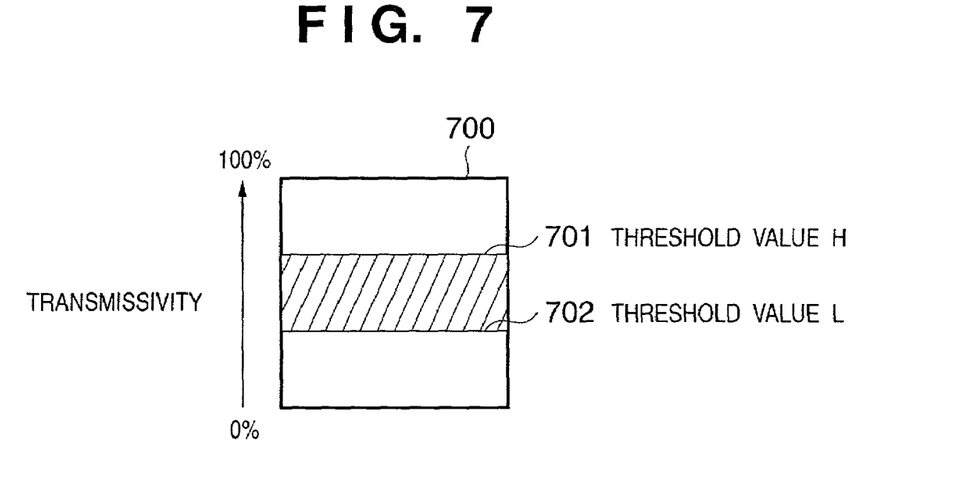
FIG. 7 shows attribute designation data where threshold values L and H are set between transmissivity 0% and 100%.

To determine attribute data of the new pixel based on the transmissivity $\alpha$ and priority order of the attribute data, attribute designation data 700 shown in FIG. 7 is prepared. The attribute designation data 700 includes threshold value H 701 and threshold value L 702, set anywhere between the transmissivity 0% and 100%. The attribute designation data 700 is referred to when the source pixel is overlaid on the destination pixel. When the value of the transmissivity $\alpha$ is high, which is equal to or larger than the threshold value H 701, the destination pixel attribute data is adopted as the new pixel attribute data. When the value of the transmissivity $\alpha$ is low, which is equal to or lower than the threshold value L 702, the source pixel attribute data is adopted as the new pixel attribute data. When the value of the transmissivity $\alpha$ falls within the range of the threshold value L 702 and the threshold value H 701, attribute data having a higher priority order is adopted as the new pixel attribute data. The priority order of the pixel attribute data is set not simply based on the type of attribute data, but is set for all combinations of the destination pixel attribute data and source pixel attribute data. Thus, in a case where pixels having different attributes are to be synthesized, attribute data of the synthesized pixel can be determined in accordance with the combination of the attributes.

Figure 8:
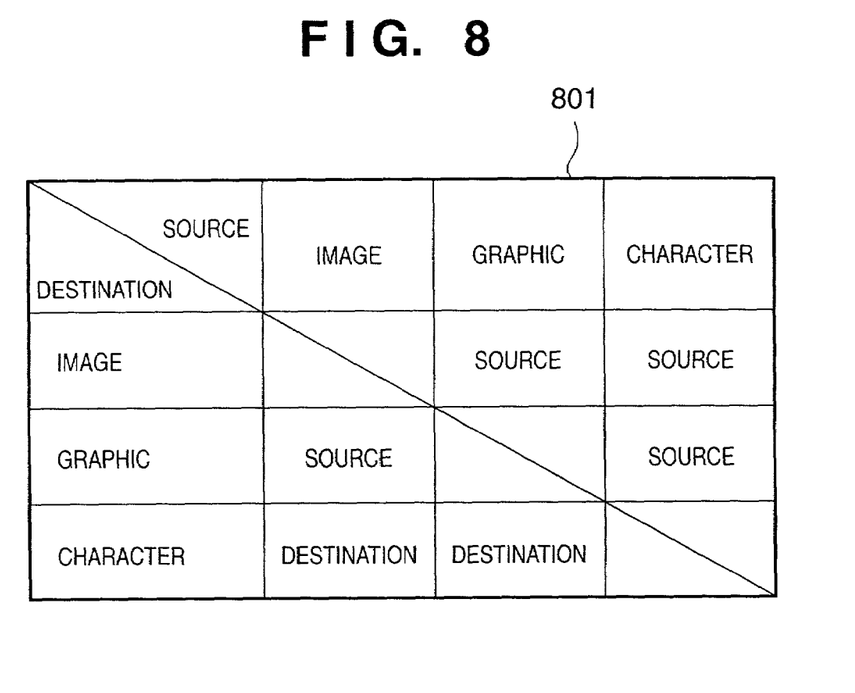
FIG. 8 is a table showing priority orders set in pixel attribute data.

FIG. 8 shows an example of a priority order table 801 for the pixel attribute data 301 to 303 shown in FIG. 3. The priority order table 801 shows pixels having a higher priority order with respect to all combinations of the destination pixel attributes and source pixel attributes. The priority order table 801 is set such that the character attribute data is prioritized. For instance, when source pixel attribute data is an image and destination pixel attribute data is a character, the destination pixel having character attribute data has a higher priority. Note that the diagonal line in the priority order table 801 indicates the case where the destination pixel and source pixel have the same attribute data, thus attribute data does not change.

The priority order table 801 shown in FIG. 8 is also stored in the RAM 205 or NVRAM 216 or the like. The priority order table and threshold value may be fixedly determined in advance, or may be set as desired by an operator or a host computer. Furthermore, the priority order table and threshold value may be applied uniformly to all printing jobs, or may be changed for each job. In the case where the priority order table and threshold value are changed for each job, the host computer transmits the table 801 to the printing apparatus in a job header or the like. Furthermore, in a case where form data, stored in the printing apparatus, is synthesized with print data transmitted from the host computer, the priority order table and threshold value may be prepared for each form data.

Figure 9:
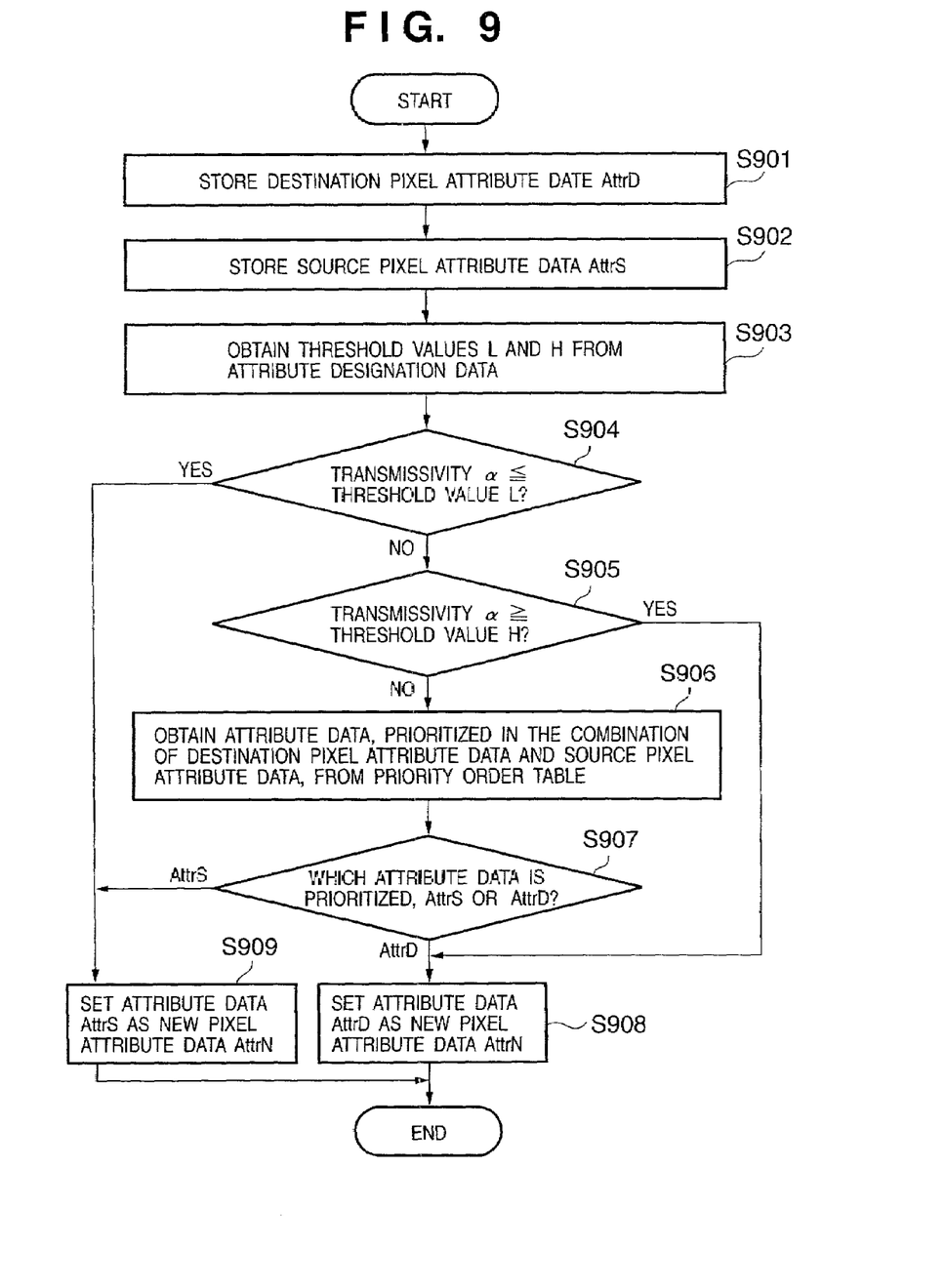
FIG. 9 is a flowchart showing processing steps of setting new attribute data according to a second embodiment.

With reference to the flowchart in FIG. 9, a description is provided on the steps of determining attribute data of a new pixel at the time of overlaying the source pixel on the destination pixel according to the second embodiment.

In step S901, the destination pixel attribute data AttrD is obtained and stored.

In step S902, the source pixel attribute data AttrS is obtained and stored.

In step S903, threshold values L and H are obtained from the attribute designation data.

In step S904, it is determined whether or not transmissivity $\alpha \leq$ threshold value L stands. When transmissivity $\alpha \leq$ threshold value L stands, the control proceeds to step S909 where the source pixel attribute data AttrS is adopted as the new pixel attribute data AttrN. On the other hand, when transmissivity $\alpha \leq$ threshold value L does not stand in step S904, the control proceeds to step S905.

In step S905, it is determined whether or not transmissivity $\alpha \geq$ threshold value H stands. When transmissivity $\alpha \geq$ threshold value H stands, the control proceeds to step S908 where the destination pixel attribute data AttrD is adopted as the new pixel attribute data AttrN. However, when transmissivity $\alpha \geq$ threshold value H does not stand in step S905, the control proceeds to step S906.

Step S906 is executed when threshold value L<transmissivity α<threshold value H stands. In this step, prioritized data in a combination of the destination pixel attribute data AttrD and source pixel attribute data AttrS is obtained from the priority order table.

In step S907, if the destination pixel attribute data AttrD has a higher priority, the control proceeds to step S908, while if the source pixel attribute data AttrS has a higher priority, the control proceeds to step S909.

In step S908, the destination pixel attribute data AttrD is set as the new pixel attribute data AttrN.

In step S909, the source pixel attribute data AttrS is set as the new pixel attribute data AttrN.

The operation according to the second embodiment is performed in the foregoing manner.

In the first embodiment, when determining attribute data of a new pixel, obtained as a result of overlaying the source pixel on the destination pixel, the transmissivity α and threshold value T are used as criteria. However, there is a case where the transmissivity α and only one threshold value T cannot sufficiently serve as criteria. For instance, in a case where the transmissivity α has the same value or close value as the threshold value T, attribute data of the new pixel uniformly determined by the steps in FIG. 6 is not always appropriate. Assume herein the case of synthesizing a character image with a photographic image. If both images account for the synthesized image at the same rate, it is preferable that the synthesized image be regarded as a character image for improving image quality. However in the first embodiment, even in such case, an attribute of the synthesized pixel is uniformly determined based only on the comparison result of the transmissivity with the threshold value.

On the other hand, according to the second embodiment, by virtue of prioritizing the destination pixel attribute data and source pixel attribute data, appropriate attribute data can be determined even in a case where the transmissivity is set in an intermediate value, e.g., 50%.

Furthermore, since the attribute data is prioritized for the case where the transmissivity falls within a predetermined range, the priority order becomes effective only when the ratio between the source pixel and destination pixel in a synthesized pixel is in a predetermined range. By virtue of this, when the transmissivity is set in an intermediate value, a most appropriate attribute can be selected according to attribute data of a synthesized pixel.

THIRD EMBODIMENT

In the above-described second embodiment, only one set of threshold values are referred regardless of the combination of the destination pixel attribute data and source pixel attribute data. In other words, the threshold values L and T are used for any combinations of attribute data. However, the third embodiment is characterized by providing a threshold value for each combination of the destination pixel attribute data and source pixel attribute data.

Figure 10:
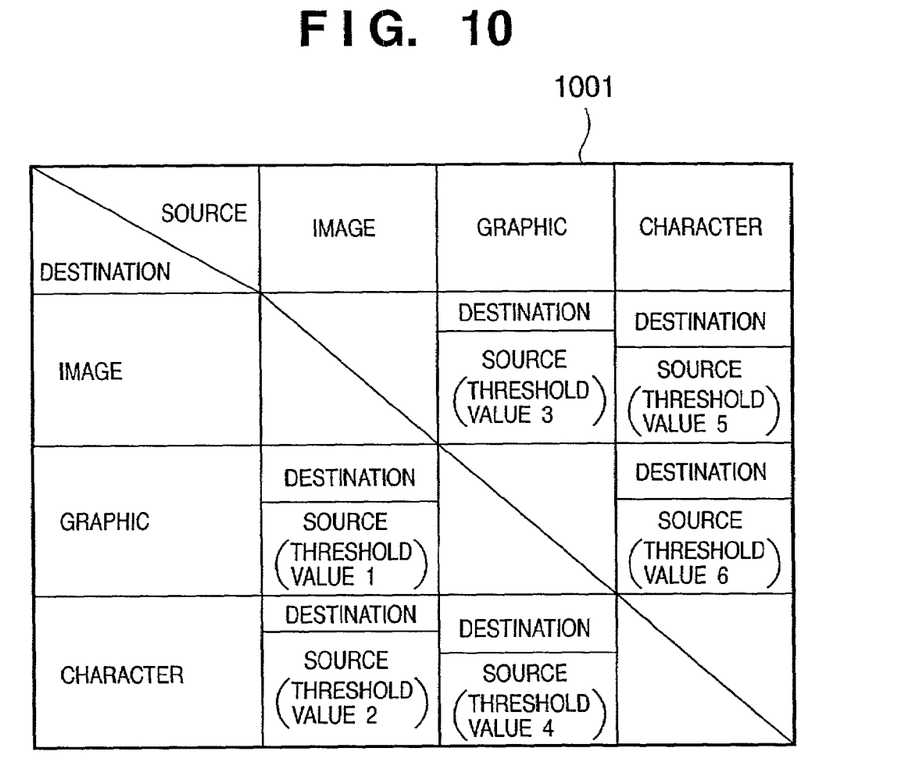
FIG. 10 is a table where the attribute designation data shown in FIG. 5 is provided for each combination of destination pixel attribute data and source pixel attribute data.

FIG. 10 is a table where the attribute designation data, such as that shown in FIG. 5, is provided for each combination of the destination pixel attribute data and source pixel attribute data. More specifically, a threshold value is set for each combination of attribute data. When a source pixel is overlaid on a destination pixel, the threshold value T is obtained from the attribute designation data corresponding to the combination of the attributes. Then, as similar to the first embodiment, if transmissivity α≧threshold value T stands, the destination pixel attribute data is adopted as the new pixel attribute data, while if transmissivity α<threshold value T stands, the source pixel attribute data is adopted as the new pixel attribute data.

For instance, the table shown in FIG. 10 is referred for the combination of attributes "image" and "graphic". When the source pixel has the "image" attribute, the destination pixel has the "graphic" attribute, and a threshold value of the transmissivity is equal to or larger than the threshold value T1, the destination pixel attribute data "graphic" is set as an attribute value of the synthesized pixel. On the other hand, when the source pixel has the "graphic" attribute, the destination pixel has the "image" attribute, and a threshold value of the transmissivity is equal to or larger than the threshold value T3, the destination pixel attribute data "image" is set as an attribute value of the synthesized pixel. In the foregoing manner, attribute data of a synthesized pixel is determined in accordance with the transmissivity and the combination of the destination pixel attribute data and source pixel attribute data.

The threshold value table shown in FIG. 10 is also stored in the RAM 205 or NVRAM 216 or the like.

The steps of determining attribute data of a new pixel at the time of overlaying a source pixel on a destination pixel is described with reference to the flowchart in FIG. 11.

In step S1101, the destination pixel attribute data AttrD is obtained and stored.

In step S1102, the source pixel attribute data AttrS is obtained and stored.

In step S1103, the threshold value T (T=1 to 6), corresponding to a combination of the destination pixel attribute data AttrD and source pixel attribute data AttrS, is obtained from the table 1001.

If transmissivity α≧threshold value T stands in step S1104, the control proceeds to step S1105 where the destination pixel attribute data AttrD is set as new pixel attribute data AttrN. On the other hand, if transmissivity α<threshold value T stands in step S1104, the control proceeds to step S1106 where source pixel attribute data AttrS is set as new pixel attribute data AttrN.

The operation according to the third embodiment is performed in the foregoing manner.

Since the third embodiment provides a threshold value for each combination of the destination pixel attribute data and source pixel attribute data, attribute data for a synthesized pixel can be determined under more detailed conditions than the second embodiment.

Attribute data, determined in each of the above-described embodiments, is used in the color conversion processing for converting R, G and B color space to M, C, Y and K color space. In this processing, if a pixel having black in the R, G and B space has a "character" attribute, the color of this pixel is converted to K so as to clearly express the black color of the character. On the other hand, if this pixel has an "image" attribute, the color of this pixel is converted to a combination color of M, C and Y so as to express the black color which naturally blends in with peripheral pixels. Furthermore, based on the attribute data, dither processing appropriate for a printing image can be performed. For instance, in the case of a "character" attribute, a multi-valued image is binarized by simple binarization processing, whereas in the case of an "image" attribute, a multi-valued image is binarized by dither processing. As described above, by virtue of attribute data, it is possible to obtain a high-quality print image.

As set forth above, in the conventional synthesizing processing, attribute data of a source pixel, which is overlaid on a destination pixel, is simply set as the attribute data of a synthesized pixel. However, since the third embodiment employs attribute data of each pixel and transmissivity α, determination of new pixel attribute data can be made in various manner, making it possible to set most appropriate attribute data.

OTHER EMBODIMENTS

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes of software for realizing the functions of the aforementioned embodiments to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention. Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

Figure 11:
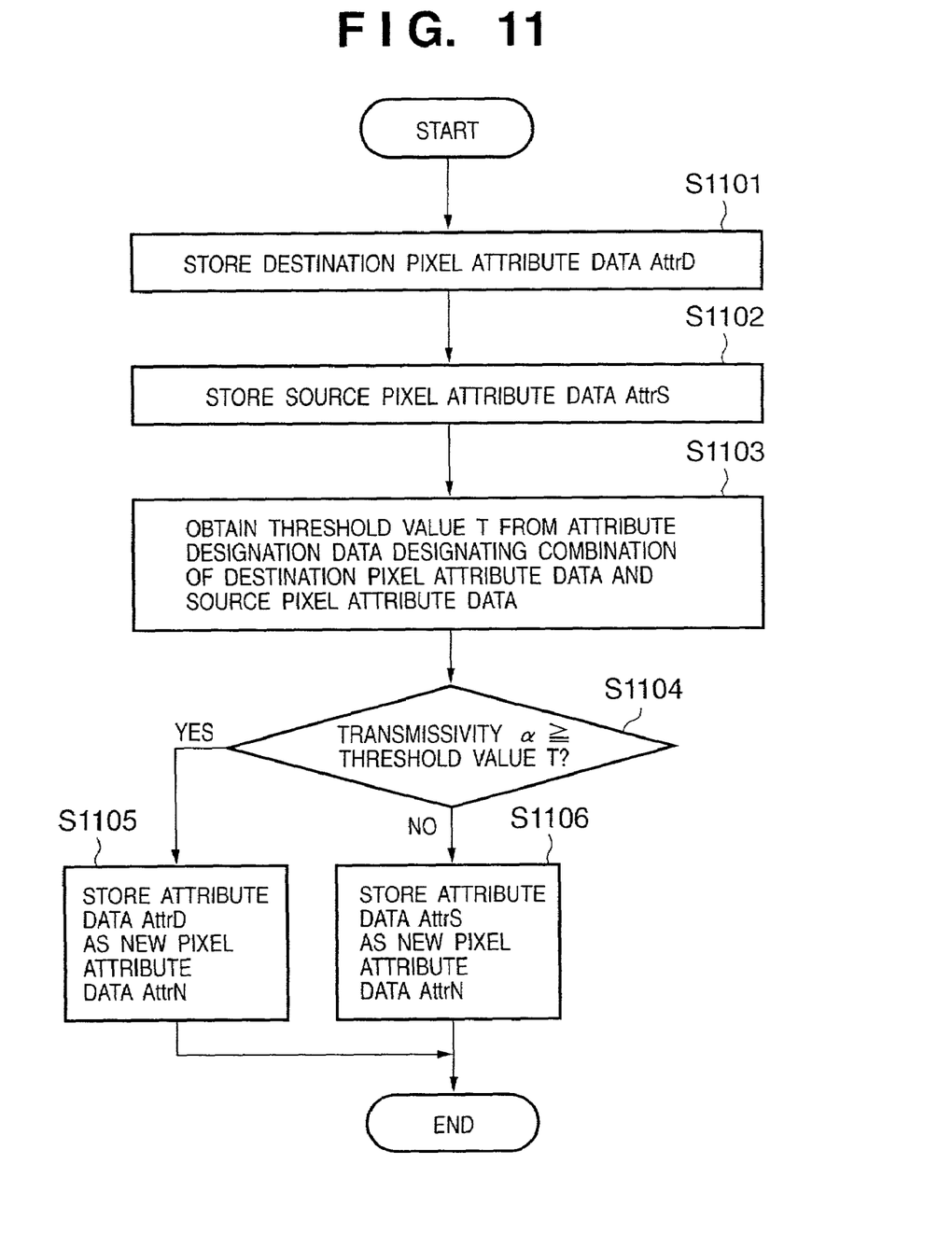
FIG. 11 is a flowchart showing processing steps of setting new attribute data according to a third embodiment.

In a case where the present invention is applied to the aforesaid storage medium, the storage medium stores program codes corresponding to the above-described flowcharts (shown in FIGS. 6, 9, 11).

As has been set forth above, according to the above-described embodiments, it is possible to determine an attribute of a synthesized pixel according to a transmissivity. Therefore, instead of simply setting an attribute of an overlaying pixel as an attribute of the synthesized pixel, an attribute of the synthesized pixel is determined based on the ratio of the component of the source pixel to the component of the destination pixel included in the synthesized pixel. Furthermore, in a case where the components of the source pixel and destination pixel account for the synthesized pixel at the similar rate, a priority order is designated. An attribute of the new pixel is determined based on the priority order.

Furthermore, criteria for determining an attribute of a synthesized pixel are changed in accordance with the attributes of the source pixel and destination pixel. Accordingly, an attribute appropriate for the synthesized pixel can be provided.

By virtue of the above effects, image processing suitable to the type of image, represented by the attribute data, can be performed after synthesizing processing.

As many apparently widely different embodiments of the present invention can be made without departing from the spirit and scope thereof, it is to be understood that the invention is not limited to the specific embodiments thereof except as defined in the claims.

What is claimed is:

1. An image forming apparatus comprising:
   a color determination unit that determines color information of a pixel to be synthesized based upon a color of a source pixel, a color of a destination pixel and a transmissivity,
   an attribute determination unit that determines attribute information of the pixel to be synthesized based upon attribute information of the source pixel, attribute information of the destination pixel and the transmissivity, wherein the attribute information of a pixel indicates that the pixel belongs to which of an image, a graphic or a character; and
   an image processing unit that performs image processing based upon the attribute information of each pixel determined by said attribute determination unit.

2. The apparatus according to claim 1, wherein in a case where the transmissivity is higher than a threshold value, said attribute determination unit determines the attribute information of the pixel to be synthesized being attribute information of the destination pixel.

3. The apparatus according to claim 1, wherein said attribute determination unit determines the attribute of the pixel to be synthesized being preferential attribute information defined in advance according to a combination of the attribute information.

4. The apparatus according to claim 2, wherein the threshold value is predefined in accordance with a combination of the attribute information.

5. The apparatus according to claim 1, wherein when a conversion processing from RGB color space into YMCBk color space is performed, said image processing unit converts a black pixel represented by the RGB color components into a black pixel representative by a Bk color component.

6. The image processing apparatus according to claim 1, further comprising a printing unit that performs printing based upon pixels processed by said image processing unit.

7. An image forming method comprising:
   a color determining step of determining color information of a pixel to be synthesized based upon a color of a source pixel, a color of a destination pixel and a transmissivity, and
   an attribute determining step of determining attribute information of the pixel to be synthesized based upon attribute information of the source pixel, attribute information of the destination pixel and the transmissivity, wherein the attribute information of a pixel indicates that the pixel belongs to which of an image, a graphic or a character; and
   an image processing step of performing an image processing based upon the attribute information of each pixel determined in said attribute determining step.

8. The method according to claim 7, wherein in a case where the transmissivity is higher than a threshold value, said attribute determining step determines the attribute information of the pixel to be synthesized being attribute information of the destination pixel.

9. The method according to claim 7, wherein said attribute determining step determines the attribute of the pixel to be synthesized being preferential attribute information defined in an advance according to a combination of the attribute information.

10. The method according to claim 8, wherein the threshold value is predefined in accordance with a combination of the attribute information.

11. The method according to claim 7, wherein when a conversion processing from RGB color space into YMCBk color space is performed, said image processing step converts a black pixel represented by the RGB color components into a black pixel represented by a Bk color component.

12. The method according to claim 7, further comprising a printing step of performing printing based upon pixels processed in said image processing step.

13. A computer program embodied on a computer-readable storage medium, comprising:
   a color determining step of determining color information of a pixel to be synthesized based upon a color of a source pixel, a color of a destination pixel and a transmissivity, and
   an attribute determining step of determining attribute information of the pixel to be synthesized based upon attribute information of the source pixel, attribute information of the destination pixel and the transmissivity, wherein the attribute information of a pixel indicates that the pixel belongs to which of an image, a graphic or a character; and
   an image processing step of performing an image processing based upon the attribute information of each pixel determined in said attribute determining step.

14. The computer program according to claim 13, wherein in a case where the transmissivity is higher than a threshold value, said attribute determining step determines the attribute information of the pixel to be synthesized being attribute information of the destination pixel.

15. The computer program according to claim 13, wherein said attribute determining step determines the attribute of the pixel to be synthesized being preferential attribute information defined in advance according to a combination of the attribute information.

16. The computer program according to claim 14, wherein the threshold value is predefined in accordance with a combination of the attribute information.

17. The computer program according to claim 13, wherein when a conversion processing from RGB color space into YMCBk color space is performed, the image processing step converts a black pixel represented by the RGB color components into a black pixel represented by a Bk color component.

18. The computer program according to claim 13, further comprising a printing step of performing printing based upon pixels processed in said image processing step.

* * * * *

UNITED STATES PATENT AND TRADEMARK OFFICE
CERTIFICATE OF CORRECTION

PATENT NO. : 7,027,184 B2  Page 1 of 1
APPLICATION NO. : 09/893644
DATED : April 11, 2006
INVENTOR(S) : Kentat Matsui It is certified that error appears in the above-identified patent and that said Letters Patent is hereby corrected as shown below:

<u>COLUMN 7</u>:

Line 48, "SECNOD" should read --SECOND--.

<u>COLUMN 12</u>:

Line 34, "representative" should read --represented--.
    Line 63, "an" should be deleted.

Signed and Sealed this

Nineteenth Day of December, 2006

JON W. DUDAS
*Director of the United States Patent and Trademark Office*